(12) United States Patent
Shi et al.

(10) Patent No.: US 8,167,207 B2
(45) Date of Patent: May 1, 2012

(54) INTEGRATED OPTICAL EXIT WINDOW

(75) Inventors: David Tsi Shi, Stony Brook, NY (US); Alan J. Epshteyn, Miller Place, NY (US); Edward Voli, East Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 496 days.

(21) Appl. No.: 12/173,528

(22) Filed: Jul. 15, 2008

(65) Prior Publication Data
US 2010/0012726 A1 Jan. 21, 2010

(51) Int. Cl.
*G06K 7/10* (2006.01)
(52) U.S. Cl. .................... 235/455; 235/462.45
(58) Field of Classification Search .......... 235/455, 235/454, 462.42, 462.45, 272.01
See application file for complete search history.

(56) References Cited

U.S. PATENT DOCUMENTS

| 4,955,693 | A |  | 9/1990 | Bobba |
| 5,693,930 | A |  | 12/1997 | Katoh |
| 6,105,869 | A |  | 8/2000 | Scharf |
| 2003/0062413 | A1 |  | 4/2003 | Gardiner |
| 2006/0027659 | A1 | * | 2/2006 | Patel et al. ............... 235/454 |
| 2007/0080280 | A1 | * | 4/2007 | Havens ............... 250/201.1 |
| 2008/0156876 | A1 | * | 7/2008 | Vinogradov ........... 235/462.01 |

OTHER PUBLICATIONS

International Search Report and the Written Opinion of the International Searching Authority for PCT/US2009/049784 mailed Apr. 9, 2009.
International Preliminary Report on Patentability mailed on Jan. 27, 2011 for International Application No. PCT/US2009/049784.

* cited by examiner

*Primary Examiner* — Daniel St.Cyr

(57) ABSTRACT

A device including a housing, an imaging engine and a transparent exit window. The imaging engine is located within the housing. The exit window is in the housing allowing light to pass from an exterior of the device to the imaging engine within the housing. The exit window has a plurality of segments. Each of the segments has a corresponding optical property.

10 Claims, 3 Drawing Sheets

INTEGRATED OPTICAL EXIT WINDOW

BACKGROUND

Optical devices such as scanners and imagers are typically contained within a housing. Generally, the housing includes a transparent exit window that serves to fully enclose the housing while allowing the passage of light therethrough. Typically, the exit window provides no additional optical function, but can introduce negative optical effects.

SUMMARY OF THE INVENTION

The present application relates to a device comprising a housing, an imaging engine, and a transparent exit window. The imaging engine is located within the housing. The exit window is located in the housing and allows light to pass from an exterior of the device to the imaging engine within the housing. The exit window has a plurality of segments. Each of the segments has a corresponding optical property.

The present application further relates to an exit window comprising a plurality of segments. Each of the segments has a corresponding optical property. The exit window is sized to be positioned in a housing of a mobile electronic device, and is transparent to allow light to pass from an interior of the housing to an exterior of the housing.

The present application further relates to a device comprising a housing, an imaging means located within the housing for collecting images, and a window means for allowing light to pass from an exterior of the device to the imaging engine within the housing. The window means has a plurality of segments. Each of the segments has a corresponding optical property.

DETAILED DESCRIPTION

Figure 1:
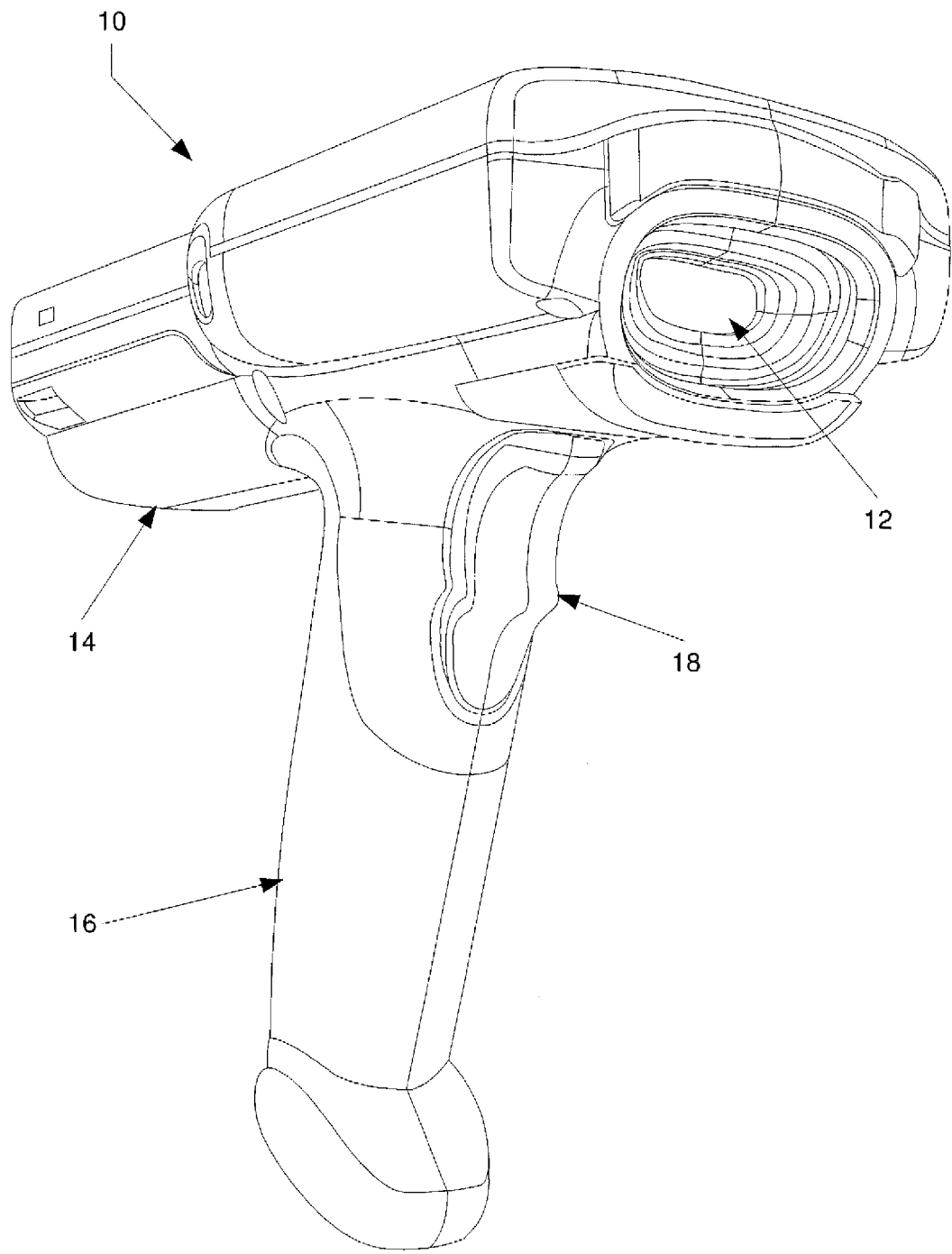
FIG. 1 shows a perspective view of a device including an integrated optical exit window according to an exemplary embodiment of the present invention.

The exemplary embodiments of the present invention may be further understood with reference to the following description and the appended drawings, wherein like elements are referred to with the same reference numerals. The exemplary embodiments of the present invention describe a system for an integrated exit window in an optical device. The exemplary embodiments of the integrated optical exit window comprise one or more optical segment zones. The use of the integrated optical exit window along with its advantages will be discussed in detail below.

A conventional parallel plate exit window typically only serves to close the housing over optical components and allow light to pass through. Particularly in mobile devices, wherein space is very limited, the exit window may be located in close proximity to optical components, leading to difficulties such as internal reflection, optical distortion, etc. In the exemplary embodiments described herein, an integrated optical exit window is provided that may eliminate optical defects and provide beneficial optical effects.

The integrated optical exit window will be described with reference to an arrangement for an optical scanning device. However, those skilled in the art will understand that this device is exemplary only and that the exemplary integrated optical exit window may be applied to any optical device with a window, such as a laser scanner. That is, in this description, the term "optical device" refers to any device that collects light for the purpose of collecting data such as a laser scanner, a bar code reader, an image scanner, a camera, a charge coupled device, etc. Also, those skilled in the art will understand that the term "transparent" refers to the ability of a material to pass light through itself. It should be noted that the optical device may be mobile or stationary.

Figure 2:
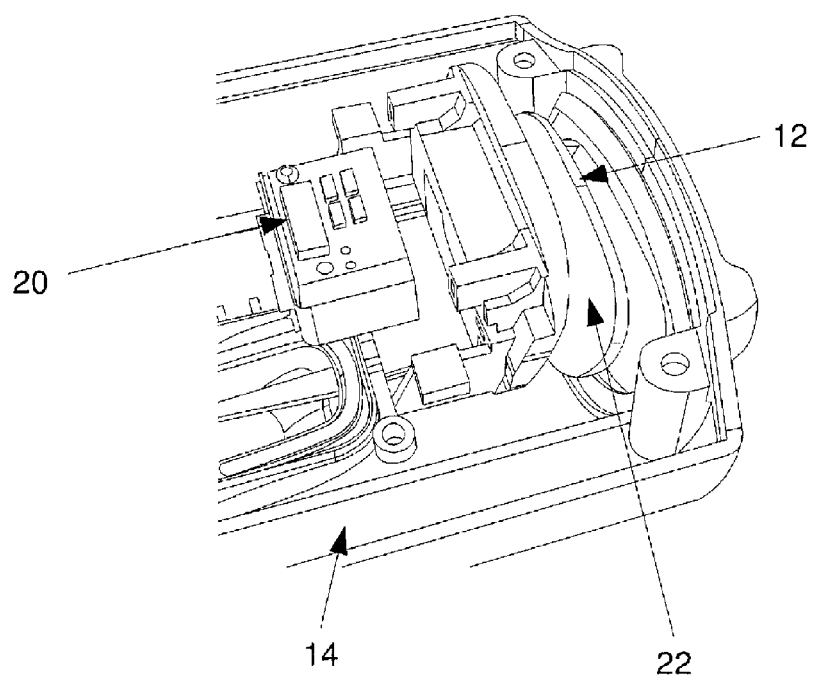
FIG. 2 shows a perspective view of the device of FIG. 1 with a top of a housing thereof removed to show the integrated optical exit window according to the exemplary embodiment of the present invention.

FIG. 1 shows an exemplary optical device 10, which in this embodiment is a bar code scanner including an exit window 12 mounted in a housing 14 that includes, for example, a pistol grip 16 and a scanning actuator 18. As shown in FIG. 2, a scanning engine 20 (e.g., an optical scanner) is mounted within the housing 14 along with supporting electronics, a battery, connectors, etc. The scanning engine 20 may include at least an illumination system and an imaging system, as will be illustrated below. As used in this disclosure, an imaging system may include any of the various types of systems for collecting optical data that are known in the art. As would be understood by those skilled in the art, the position of the scanning engine 20 relative to the exit window 12 is determined based on the properties of the scanning engine 20, the exit window 12 and the desired functionality of the device 10. Specifically, the optical properties of the exit window 12 and the scanning engine 20 dictate an optimal distance and angle between the scanning engine 20 and an inner face of the exit window 12 and, consequently, determining the size of a space 22 within the housing forward of the scanning engine 20. The optical properties of the exit window 12 will be discussed in detail below.

Figure 3:
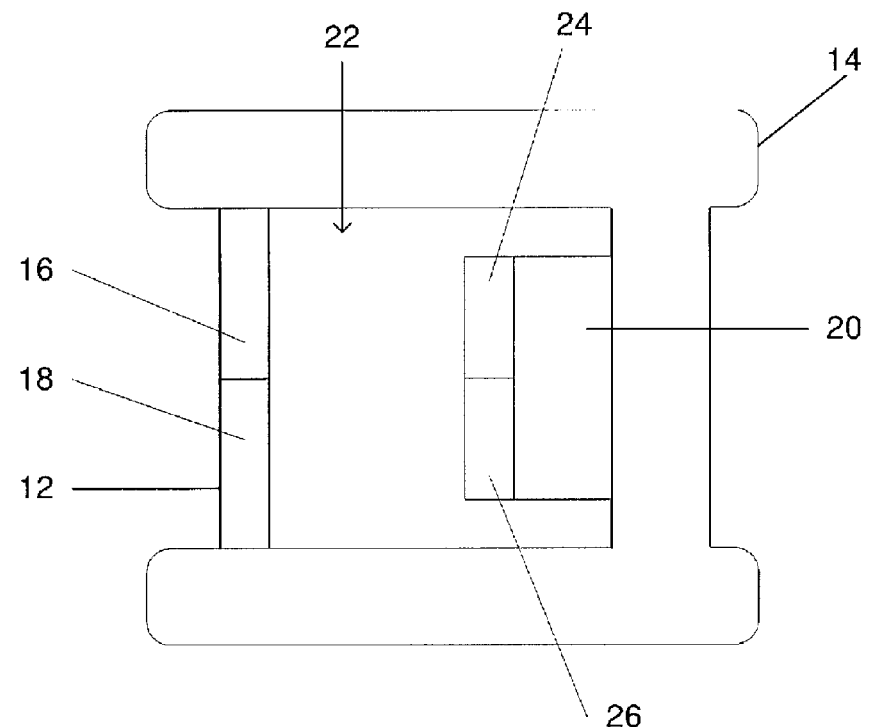
FIG. 3 shows a cross-sectional view of the device of FIG. 2 with the integrated optical exit window according to the exemplary embodiment of the present invention.

FIG. 3 shows a cross-sectional view of the optical device 10 with the transparent exit window 12 according to an exemplary embodiment of the present invention. The exit window 12 may be a composite, transparent exit. The exit window 12 may comprise a single layer or may comprise multiple layers of the same or different materials. The scanning engine may include an illumination element 24 and an imaging element 26. The function of the illumination element 24 may be to illuminate an image to be captured by the device 10 in order to aid in quick and efficient processing. The illumination element 24 may pass light from, for example, a laser, an LED, etc. The function of the imaging element 26 is to capture the image for processing. Those of skill in the art will understand that the positions of the illumination element 24 and the imaging element 26 relative to one another, to the main body of the scanning engine 20, and to the rest of the housing are only exemplary and that other positions are possible in other embodiments.

The exit window 12 may be subdivided into separate functional zones. FIG. 3 illustrates two such zones 16 and 18. Zone 16 is disposed within the exit window 12 so as to aid in the operation of the illumination element 24, while zone 18 is disposed to aid in the operation of the imaging element 26. Each zone has a predetermined optical property and a predetermined relationship to the other zone or zones. Optical functions may be, for example, imaging focus, aiming pattern generation, illumination focus, etc. Zones may be molded as one part or may be formed on an individual basis by compression molding techniques.

Figure 4:
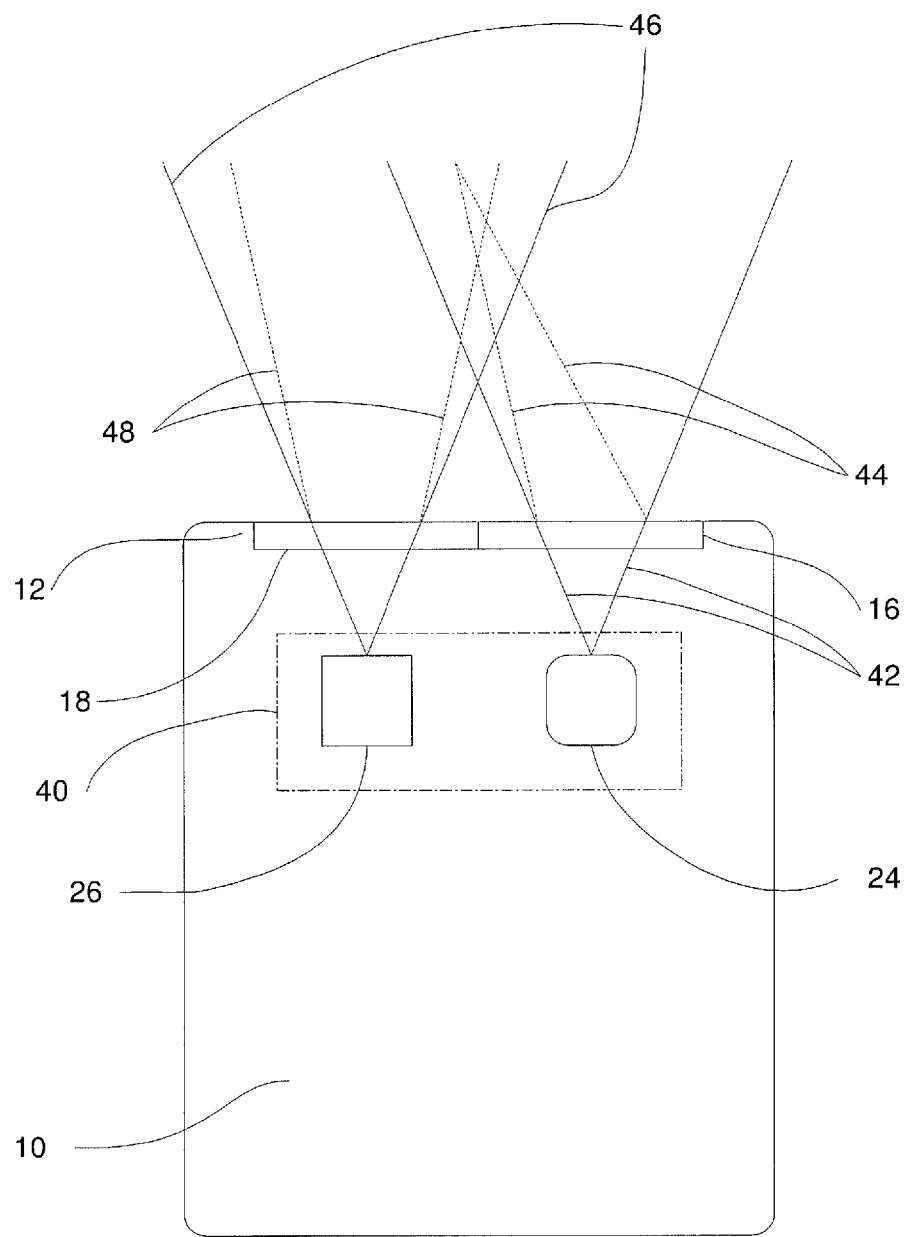
FIG. 4 shows a view of the optical benefits that may be introduced by the integrated optical exit window according to the exemplary embodiment of the present invention.

FIG. 4 shows an alternate view of the exemplary device 10, with the illumination element 24 and imaging element 26 exposed by view cutaway 40. FIG. 4 illustrates effects that one exemplary exit window 12, with functional zones 16 and 18 disposed as described above with reference to FIG. 3, may have on the performance of the device 10. FIG. 4 illustrates the illuminated area 42 that may be produced by the illumination element 24 using a standard parallel exit window. In this exemplary embodiment, the functional zone 16 may change the aim of the illumination to an alternate illuminated area 44. Additionally, the functional zone 16 may aid in the generation of an aiming pattern by the illumination element 24, so that a user of the device 10 may more easily aim at a desired image.

Further, FIG. 4 illustrates the effect that the exit window 12 may have on the imaging element 26. A standard viewing area of the imaging element 26 may be represented by viewing area 46. The exemplary zone 18 may change the focus of viewing area 46, resulting in a modified viewing area 48. The combined effects of the two zones 16 and 18 of the exit window 12 may thus improve the performance (e.g., time to capture an image, quality of captured image, etc.)

The exit window 12 may further be formed in order to minimize the internal reflection of the light emitted by the illumination element 24; such internal reflection may interfere with the ability of the imaging element 26 to capture images outside the housing 14. For example, in one exemplary embodiment, rather than having a flat surface that may create a mirror-like reflective effect, the exit window 12 may have a surface figure and profile to re-direct the reflected light emitted from the illumination element 24 such that it does not reflect into the imaging element 26. This may reduce or minimize the internal reflection, and thus improve the performance of the imaging element 26.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A device, comprising:
   a housing comprising a transparent exit window having a plurality of segments; and
   an imaging engine comprising an illumination element and an imaging element, the imaging element being positioned in close proximity to the transparent exit window to minimize internal reflections from the exit window to the imaging element,
   wherein the transparent exit window allows light generated by the illumination element to pass from an exterior of the device to the imaging element within the housing, a first one of the segments of the exit window being disposed over the illumination element and a second one of the segments of the exit window being disposed over the imaging element.

2. The device of claim 1, wherein the exit window has two segments.

3. The device of claim 1, wherein the segments of the exit window have a combined optical property.

4. The device of claim 3, wherein the optical properties of the segments minimize internal reflection of the light.

5. The device of claim 1, wherein the exit window comprises one of plastic, polymer and glass.

6. The device of claim 1, wherein the exit window comprises a plurality of layers.

7. The device of claim 1, wherein the segments of the exit window are either molded as a single part or formed individually.

8. The device of claim 1, wherein the first one of the segments has a corresponding first optical property that one of modifies an imaging focus, modifies a field of view angle, modifies an aiming angle and generates an aiming pattern.

9. The device of claim 1, wherein a second one of the segments has a corresponding second optical property that one of modifies an imaging focus, modifies a field of view angle, modifies an aiming angle and generates an aiming pattern.

10. The device of claim 1, wherein the exit window is one of integrally formed with the housing and removable from the housing.

* * * * *